United States Patent [19]
Tyau

[11] 3,860,833
[45] Jan. 14, 1975

[54] PULSE DISCRIMINATOR TO PREVENT CONTACT BOUNCE

[75] Inventor: Walter Fah Min Tyau, Orange, Calif.

[73] Assignee: International Telephone and Telegraph Corporation, New York, N.Y.

[22] Filed: Jan. 21, 1974

[21] Appl. No.: 435,259

Related U.S. Application Data

[62] Division of Ser. No. 304,997, Nov. 9, 1972, Pat. No. 3,832,883.

[52] U.S. Cl. ............. 307/247 A, 317/9 C, 328/162, 340/365 E
[51] Int. Cl. ........................................... H03k 17/00
[58] Field of Search ............... 307/247 A, 231, 234; 328/162, 164; 317/9 C; 340/365 E

[56] References Cited
UNITED STATES PATENTS
| | | |
|---|---|---|
| 3,504,198 | 3/1970 | Boatman .......................... 307/247 A |
| 3,588,525 | 6/1971 | Hatsukano et al. .............. 307/247 A |
| 3,721,833 | 3/1973 | Kramer ............................ 307/247 A |

OTHER PUBLICATIONS
"Eliminating the Effect of Contact Bounce", by Bond, IBM Tech. Discl. Bull., Vol. 4, No. 9, Feb. 1962, page 9.
"Bounce Eliminating Circuit", by Klose, IBM Tech. Discl. Bull., Vol. 14, No. 3, Aug. 1971, page 995.

*Primary Examiner*—Stanley D. Miller, Jr.
*Attorney, Agent, or Firm*—A. Donald Stolzy

[57] ABSTRACT

A pulse discriminator for test apparatus called a ball prover including a ball rollable in a pipeline past two axially spaced, spring biased, normally open, momentary contact switches which, when closed, discharge a capacitor, the capacitor having a charging rate lower than its discharging rate to discriminate against pulses which would normally be produced by the bouncing of one or more of the switch contacts. Pulse discrimination may also be achieved through the use of a regenerative amplifier that has hysteresis. Contact bounce would otherwise cause an erroneous total flow reading. A gate control circuit responsive to the voltage across the capacitor operates a gate to pass flowmeter pulses which are counted and indicated. The total of the pulses counted then are directly proportional to the total flow in the pipeline between the times that the switches are closed.

2 Claims, 1 Drawing Figure

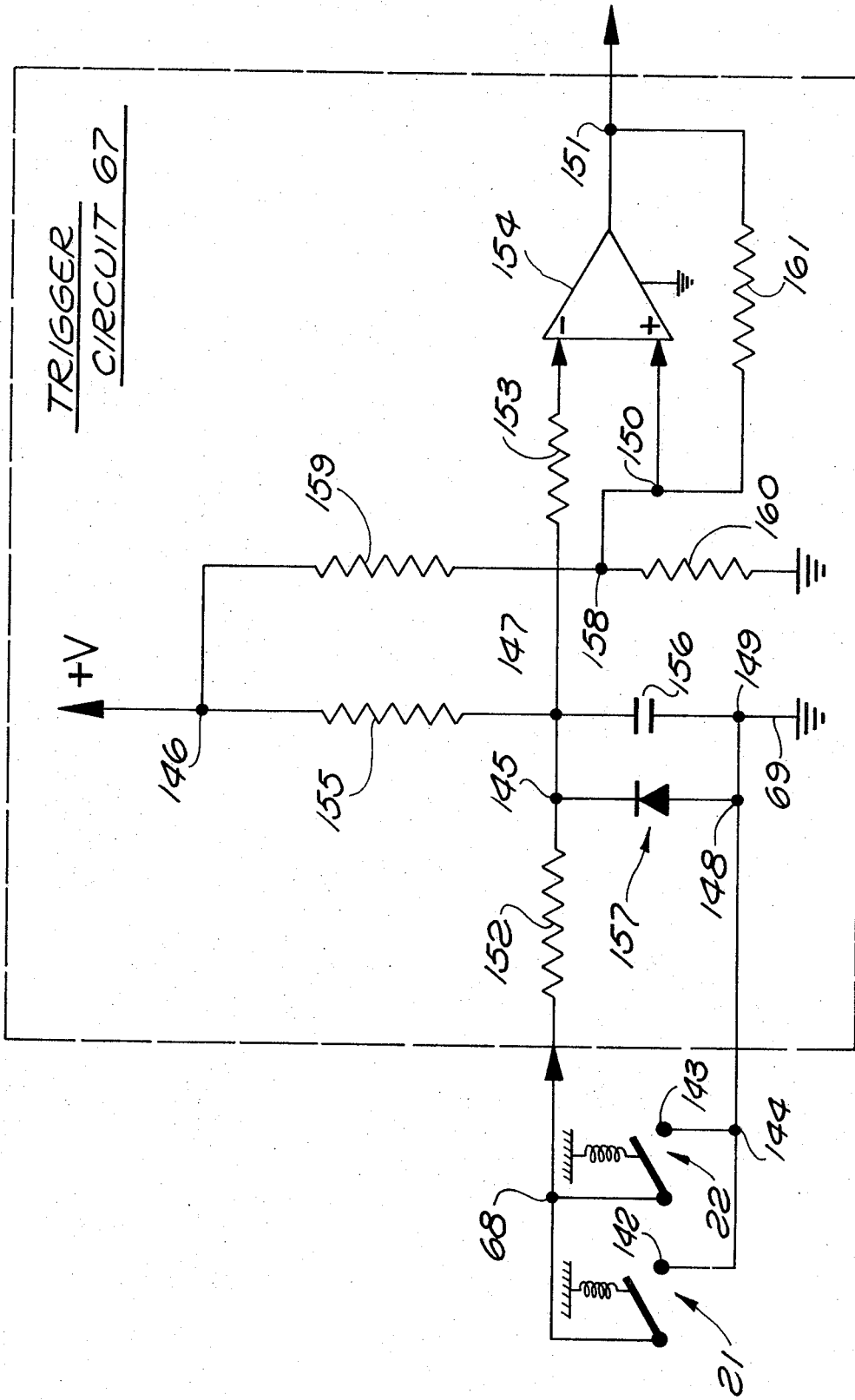

PULSE DISCRIMINATOR TO PREVENT CONTACT BOUNCE

This application is a division of copending application Ser. No. 304,997 filed Nov. 9, 1972, now U.S. Pat. No. 3,832,883, of the same title and inventor as this applicaton. The benefit of the filing date of said copending application is, therefore, hereby claimed for this application.

BACKGROUND OF THE INVENTION

This invention relates to test equipment and components thereof, and more particularly, to a pulse discriminator for a ball prover or the like.

In the past it has been the practice to test the accuracy of flowmeters, which flowmeters produce pulses at a pulse repetition frequency (PRF) directly proportional to the volume rate of fluid flow, by connecting them in series with the pipeline section of a ball prover. A section of a ball prover pipeline has two axially spaced, normally open momentary contact switches therein. The pulse output of the flowmeter under test is then counted during the time interval between the successive closures of the respective switches. The switches are actuated by the movement of a spherical ball in the prover pipeline. The ball has a diameter only slighly less than the inside diameter of the pipeline section so as to roll freely therein without allowing substantial fluid leakage therearound. The counted output pulses of the flowmeter under test are then recorded for several different fflow rates to determine if there is any nonlinearity. For a flowmeter with perfect linearity, the counted pulses for several test runs may be exactly the same or may not vary more than one pulse or a few pulses.

Prior art ball provers suffer from at least one serious disadvantage. The switches each have a pair of contacts that are mutually engaged or separate more than once when they are actuated. That is, they are conventional switches that may have, for example, bias springs and/or cantilever leaf springs to carry the contacts. The material of the contacts themselves are resilient as are the leaf or bias springs. Due to these factors alone and/or other factors, the contacts, therefore, bounce. The bouncing contacts then cause multiple pulse inputs to be provided to the ball prover circuit. These multiple pulse inputs create errors in the timing interval during which the flowmeter output pulses are counted. The ball prover then fails to perform its only function, i.e., to determine the accuracy of the flowmeter under test.

SUMMARY OF THE INVENTION

In accordance with the present invention, the above-described and other disadvantages of the prior art are overcome by the use of a regenerative amplifier having hysteresis and/or a capacitor which charges slowly when both switches are open and discharges rapidly when either switch is closed. The slow charging then prevents a bounce caused discharge from generating a high amplitude operating pulse.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

The single FIGURE is a schematic diagram of the pulse discriminator of the present invention.

DESCRIPTION OF THE PREFERRED EMBODIMENT

As shown in the single FIGURE, spring biased normally open switches 21 and 22 may be the conventional switches of a conventional ball prover. Switches 21 and 22 have contacts 142 and 143, both of which are connected to a junction 144.

A trigger circuit 67 is provided that has various junctions at 145, 146, 147, 148, 149, 150 and 151. Junctions 144, 148 and 149 are all grounded at 69. A resistor 152 is connected between junctions 68 and 145, junctions 145 and 147 being connected together. A resisor 153 is connected from junction 147 to the inverting input of a differential amplifier 154. A resistor 155 is connected between junctions 146 and 147. A capacitor 156 is connected between junctions 147 and 149. Junction 146 is maintained at potential +V. A diode 157 is connected between junctions 145 and 148, and poled to be conductive in a direction toward junction 145.

Another junction 158 is provided. A resistor 159 is connected between junctions 146 and 158. Another resistor 160 is connected from junction 158 to ground, junctions 150 and 158 being connected together and to the noninverting input of differential amplifier 154. A feedback resistor 161 is connected between junctions 150 and 151, junction 151 also being connected from the output of amplifier 154.

OPERATION

Responsive to the successive actuations of switches 21 and 22 (conventional ball prover operation), a positive pulse for each switch closure is produced at the output junction of differential amplifier 154.

An outstanding feature of the invention resides in the use of the trigger circuit 67 shown in the single FIGURE in the drawing. In operation, capacitor 156 charges to +V through resistor 155. Pulses are generated by momentary contact switches 21 and 22. This is true because capacitor 156 is, by the closure of either one of the switches 21 or 22, partially discharged through resistor 152.

The resistance of resistor 155 is larger than the resistance of resistor 152. For example, the resistance of resistor 155 may be 5,100 ohms, whereas the resistance of resistor 152 may be 82 ohms. This provides an outstanding advantage of the invention because, due to the resilience of any springs connected to switches 21 or 22, or due to the resilience of any cantilever springs carrying the spring contacts, or due to the resilience of the contacts themselves because of their bulk and/or compression moduli of elasticity, the contacts of switches 21 and 22 tend to bounce. It is highly cirtical to the proper operation of a ball prover that the contacts do not bounce. They otherwise create a measurement error. By employing the higher resistance of resistor 155, the charging rate of capacitor 156 is kept low once capacitor 156 has been discharged by a single closure of one of the switches 21 and 22. By keeping the charging rate of capacitor 156 low, any further discharge caused by contacts bouncing will produce a pulse at junction 147 connected to the inverting input of amplifier 154 which is of an amplitude so low that it will not cause trouble. That is, any small conventional threshold bias may be set in trigger circuit 67 or otherwise to suppress any small amplitude pulses produced by contact bounce. Such bias already exists and may either partially or completely suppress such small amplitude pulses at the output junction 151 of differential amplifier 154.

The foregoing description of the pulse discrimination function of some of the circuit elements of trigger circuit 67 in the single FIGURE of the drawing is related to the possibility of contact bounce causing effectively a reclosure of, for example, switch 21 after that switch has already closed once and opened once in succession in that order.

The following is a description of a regenerative amplifier in circuit 67 of the FIGURE which has a relatively large hysteresis. This regenerative amplifier acts as a pulse discriminator when, for example, switch 21 closes and then subsequently reopens.

Note that if capacitor 156 is fully charged and switch 21 first closes for a very short time and then reopens, the output of amplifier 154 might show a pulse if the potential of junction 147 rises high enough after the said reopening. This is prevented by the regenerative amplifer including amplifier 154 and the positve feed back resistor 161 which is connected to the output to the noninverting input of amplifier 154.

It has been discovered in connection with the present invention that the said regenerative amplifier has a substantial and ample hysteresis. For example, junction 151 may have a potential which jumps to its highest level when the potential of junction 147 falls below 1.1 volts and which jumps to its lowest level when the potential of junction 147 rises above 2.7 volts. A hysteresis of 1.5 volts or 1.6 volts is thus substantial and ample.

The following circuit values are typical, but not critical:

| | |
|---|---|
| Capacitor 156 | 3.3 Microfarad |
| Diode 157 | SD1 |
| Potential+V | 5.0 Volts |
| Resistor 152 | 82 Ohms |
| Resistor 153 | 4,660 Ohms |
| Resistor 155 | 5,100 Ohms |
| Resistor 159 | 3,740 Ohms |
| Resistor 160 | 3,740 Ohms |
| Resistor 161 | 10,000 Ohms |

As used herein and in the claims, the word "resistor" as employed to describe either resistor 152 or resistor 153 is hereby defined to include either a resistor of a resistane of less than, equal to or greater than 5,000 ohms or simply a conductive lead or other conductor because the resistance of either resistor 152 or resistor 153 may be quite low in some applications.

The word "connected" in any of its grammatical forms is hereby defined for use herein and in the claims to include, but not limited to, connection by a conductive lead, a resistor or other circuit element, or by a stage or otherwise.

What is claimed is:

1. A pulse discrimination circuit comprising: first and second input leads; a switch connected between said leads, said switch having a pair of contacts; first and second resistors; a capacitor, said capacitor and said first resistor being connected in series between said leads; and a D.C. source of potential, said source and said second resistor being connected in series with said capacitor, said first resistor having a smaller resistance than that of said second resistor, closure of said switch causing a pulse to appear across said capacitor, the higher resistance of said second resistor preventing said capacitor from charging at a high rate and subsequently discharging again because of any bounce of said any contact during one single actuation of said switch; and a regenerative amplifier connected across said capacitor, said regenerative amplifier having hysteresis, said regenerative amplifier including a differential amplifier having inverting and noninverting inputs and an output, and a third resistor connected from the output to the noninverting input of said differential amplifier, a main junction connected to said noninverting input, a fourth resistor connected from said main junction to the junction of said second resistor and said source, a fifth resistor connected from said main junction to said second lead, said second lead being connected to a point of reference potential, said differential amplifier being referenced to said point, and means connecting said inverting input from the junction of said capacitor and said first resistor.

2. The invention as defined in claim 1, wherein said means includes a sixth resistor.

* * * * *